Nov. 29, 1960 V. D. BELL 2,962,198
ARTICLE HOLDER FOR USE WITH AUTOMOBILES AND THE LIKE
Filed Oct. 22, 1957

INVENTOR.
VERNON D. BELL
BY Pennie, Edmonds, Morton, Barrows & Taylor.
ATTORNEYS

United States Patent Office 2,962,198
Patented Nov. 29, 1960

2,962,198

ARTICLE HOLDER FOR USE WITH AUTOMOBILES AND THE LIKE

Vernon D. Bell, Ashaway, R.I., assignor to The American Thermos Products Company, Norwich, Conn., a corporation of Ohio Filed Oct. 22, 1957, Ser. No. 691,720

3 Claims. (Cl. 224—29)

The present invention relates to an accessory apparatus, for use with automobiles etc., for holding and/or supporting an article in a desired manner.

The principal feature of the present invention resides in the provision of a device, in the nature of an attachment or accessory, which is operative, in combination with an automobile seat, to support an article, such as a vacuum bottle, in an upright or other desired position. In this respect, the invention provides an improved holder device which may be detachably secured to an automobile seat in such manner as to support an article in an improved and highly effective manner.

More specifically, the invention provides an improved article holding device which is removably gripped between the seat and back cushions of an automobile seat assembly in a manner such that the device, in combination with the back cushion of the seat assembly, holds and supports an article, such as a vacuum bottle.

Another specific feature of the invention resides in the provision of an article holding device of the type and having the characteristics set forth above which will support articles of various size with equal effectiveness.

For a better understanding of the invention, reference should be made to the following description and to the accompanying drawing, in which.

Figure 4:
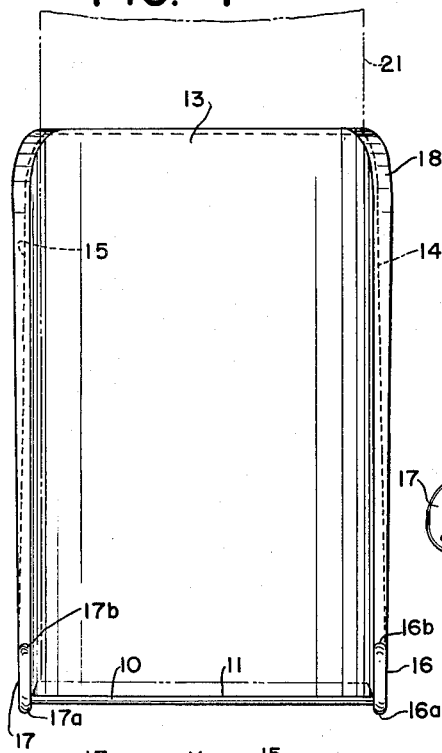
Fig. 4 is an enlarged back elevational view of an article holding device incorporating the features of the invention.
Figure 5:
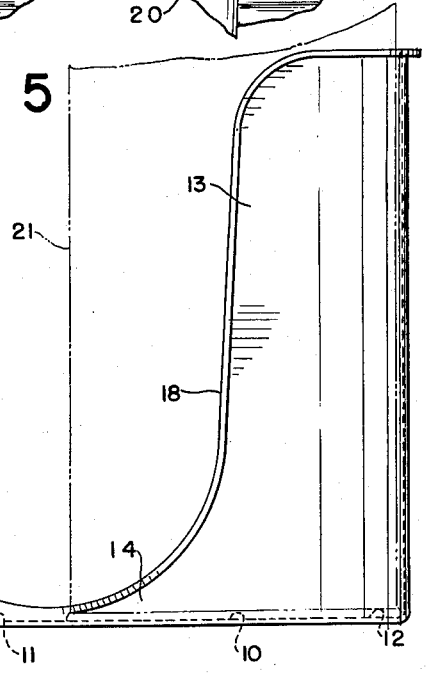
Fig. 5 is a side elevational view of the article holding device of Fig. 4, with parts broken away.
Figure 6:
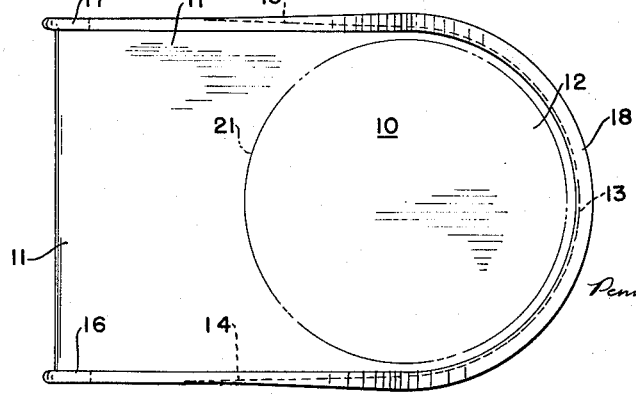
Fig. 6 is a top plan view of the device of Fig. 4.

Referring now to the drawing, and initially to Figs. 4–6 thereof, the new article holding device comprises a base portion 10, formed of a flat section of plastic material, such as styrene. The base portion 10, as shown in Fig. 6, for example, has a generally rectangular inner (left hand) end portion 11 and a generally semi-circular outer or front end portion 12.

Extending upwardly from the base portion 10, generally at right angles thereto, is an article supporting wall 13, which may be of semi-cylindrical form. Advantageously, the article supporting wall 13 has integral side wall portions 14, 15 which extend along the opposite side edges of the inner portion of the base portion 10, terminating in integral gripping flanges 16, 17. As shown best in Fig. 5, the gripping flanges 16, 17 are generally rounded in contour and are of greater vertical dimension than adjacent portions of the side walls 14, 15.

Thus, in the illustrated holding device, the gripping flanges 16, 17 have small lobes 16a, 17a which project below the flat base portion 10 and larger lobes 16b, 17b which project above base portion 10 and above adjacent portions of the side walls 14, 15.

In the illustrated form of the invention the article holder is a single piece molding, and the supporting and side walls and the base portion may be of relatively thin plastic material, since the walls impart strength to the base portion, and vice versa. It may be advantageous, however, to strengthen the upper portions of the supporting wall 13, as by providing an integral flange 18 extending about the exposed edges of the supporting and side walls 13—15.

Figure 1:
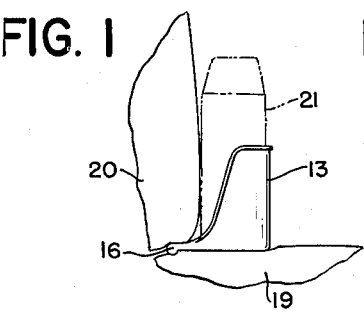
Fig. 1 is a fragmentary, cross-sectional view of an automobile seat assembly, with a holding device of the invention gripped therein, in position for supporting an article.

The new article holder is put in use by inserting the inner end of the base portion 10, which may be considered the gripping portion, between the seat cushion 19 and back cushion 20 of a seat assembly, such as commonly utilized in automobiles, for example. As shown in Fig. 1, the seat cushion 19 extends beneath the back cushion 20, with the bottom of the back cushion resting on the seat cushion. Accordingly, the base of the holder is placed upon the seat cushion 19, and the gripping portion is inserted between the cushions 19, 20. The enlarged gripping flanges 16, 17 deform the cushions, and cause the article holder to be firmly held in place. Thus, the holder is generally supported by the seat cushion 19 and held against accidental movement by the cooperative action of both cushions 19, 20.

Advantageously, the article holder is inserted between the seat and back cushions 19, 20 to an extent such that the space between the back cushion 20 and the supporting wall 13 is less than, or at least not substantially greater than the corresponding dimensions of an article to be held. Accordingly, an article 21, such as a vacuum bottle, for example, may be inserted between the back cushion 20 and supporting wall 13, so that the base of the article rests on the base portion 10 of the holder and opposite vertical sides of the article are held between the back cushion 20 and supporting wall 13.

Most effective support is obtained when the space between the back cushion 20 and the supporting wall 13 is somewhat less than the corresponding dimensions of the article 21. Accordingly, the back cushion 20, which has substantial resilience, urges the article 21 into tight engagement with the supporting wall 13. This arrangement effectively clamps the articles 21 in place, preventing rattling, etc.

Figure 2:
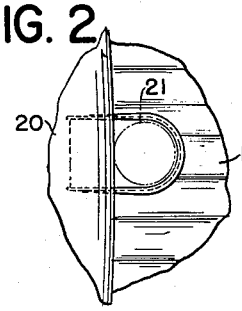
Fig. 2 is a fragmentary, top plan view of the seat assembly and holding device shown in Fig. 1.
Figure 3:
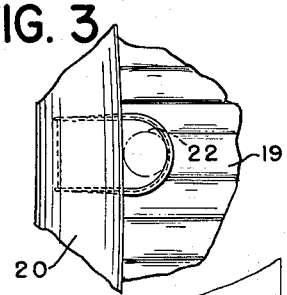
Fig. 3 is a top plan view similar to Fig. 2, with the holding device arranged to support an article of small size.

In the arrangement shown in Figs. 1 and 2 the article 21 is of generally cylindrical form, substantially corresponding in outer contour to the contour of the supporting wall 13. It will be understood, however, that the new holding device may be employed with similar effectiveness for supporting articles of different size and/or shape. Thus, in Fig. 3 an article 22 of generally cylindrical form but somewhat small diameter is effectively held in place by merely inserting the article holder further between the cushions 19, 20. Since the front surface or wall of the back cushion 20 cooperates with the supporting wall 13 of the holder, adjustment for any size article within an operative range may be effected by merely adjusting the position of the holder with respect to the back cushion 20.

While the specific holding device illustrated and described herein is intended primarily for holding a generally cylindrical article, such as a vacuum bottle, it will be readily understood that the holding device may be varied substantially as to shape and size, and in other respects, without departing from the clear teachings of the invention. Accordingly, reference should be made to the following appended claims in determining the full scope of the invention.

I claim:

1. An article holder for use in an automobile or the like having a seat assembly including a seat cushion and a back cushion, comprising a flat base portion adapted to be supported on said seat cushion having a projecting end including enlarged gripping flanges disposed generally at right angles to said base portion at opposite sides thereof, said projecting end being adapted to be inserted between and gripped by said seat and back cushions, the gripping flanges being adapted to deform one of said cushions when said end is inserted therebetween whereby said holder is firmly gripped in its inserted position, and an article supporting wall extending upwardly from said base portion, said wall defining an open portion facing generally in the direction of said back cushion such that said wall, said back cushion and said base portion are adapted to retain an article within at least a portion of said wall when said projecting end of said base portion is inserted between said seat and back cushions.

2. An article holder according to claim 1 in which said article supporting wall is disposed generally at right angles to said base portion and includes integral portions extending along the opposite sides of said base portion and forming said gripping flanges.

3. An article holder for use in an automobile or the like having a seat assembly including a seat cushion and a back cushion, comprising a base portion adapted to be supported on said seat cushion and having a projecting end adapted to be inserted between and gripped by said seat and back cushions, and an article supporting wall extending upwardly from said base comprising a generally semi-cylindrical wall disposed generally at right angles to said base portion, said wall having integral flange portions extending along the opposite sides of said base portion and forming means to grip said back and seat portions, said wall defining an open portion facing generally in the direction of said back cushion such that said wall, said back cushion and said base portion are adapted to retain an article within at least a portion of said wall when said projecting end of said base portion is inserted between said seat and back cushions.

References Cited in the file of this patent

UNITED STATES PATENTS

| | | |
|---|---|---|
| 2,085,661 | Janowski | June 29, 1937 |
| 2,369,552 | Ferran | Feb. 13, 1945 |
| 2,500,846 | McFarland | Mar. 14, 1950 |
| 2,554,136 | Brown | May 22, 1951 |
| 2,640,595 | Byford | June 2, 1953 |
| 2,678,682 | Thomas | May 18, 1954 |